United States Patent

Eigenmann

[11] Patent Number: 5,138,922
[45] Date of Patent: Aug. 18, 1992

[54] APPARATUS FOR BALANCING THE MASS FORCES OF A PUNCH PRESS

[75] Inventor: Oskar Eigenmann, Arbon, Switzerland

[73] Assignee: Bruderer AG, Frasnacht, Switzerland

[21] Appl. No.: 685,903

[22] Filed: Apr. 16, 1991

[30] Foreign Application Priority Data

May 9, 1990 [CH] Switzerland ............... 1571/90

[51] Int. Cl.⁵ ............................................ B30B 1/06
[52] U.S. Cl. ............................... 83/615; 83/628; 83/632; 72/450; 72/452; 74/44; 74/603; 100/282
[58] Field of Search ............... 83/615, 628, 630, 632, 83/748; 100/282, 292; 74/44, 603; 72/452, 450

[56] References Cited

U.S. PATENT DOCUMENTS

| 4,156,387 | 5/1979 | Portmann | 100/282 X |
| 4,198,846 | 4/1980 | Wrona | 72/450 |
| 4,276,823 | 7/1981 | Rotzler | 100/282 X |
| 4,757,734 | 7/1988 | Portmann | 83/615 |
| 4,817,456 | 4/1989 | Imanishi et al. | 100/282 X |

FOREIGN PATENT DOCUMENTS

| 0077634 | 4/1983 | European Pat. Off. |
| 1576245 | 5/1970 | Fed. Rep. of Germany |
| 141118 | 5/1920 | United Kingdom |
| 1151249 | 5/1969 | United Kingdom |
| 2090189 | 7/1982 | United Kingdom |
| 2189730 | 11/1987 | United Kingdom |

Primary Examiner—Frank T. Yost
Assistant Examiner—Raymond D. Woods
Attorney, Agent, or Firm—Ladas & Parry

[57] ABSTRACT

The balancing weight for the balancing of the rotating forces is connected via link members to respective balancing weights for the balancing of the oscillating forces. The balancing weights for the balancing of the oscillating forces are each pivotable mounted to the machine frame at one end via projections. At the respective opposite ends they include further projections, via which those ends are pivotably connected to each other via a pivot member. This forms the guiding of the movement of the balancing weights.

3 Claims, 1 Drawing Sheet

APPARATUS FOR BALANCING THE MASS FORCES OF A PUNCH PRESS

BACKGROUND OF THE INVENTION

1. FIELD OF THE INVENTION

The present invention relates to an apparatus for balancing the mass forces of a punch press.

2. DESCRIPTION OF THE PRIOR ART

An apparatus for balancing mass forces is disclosed e.g. in U.S. Pat. No. 4,757,734, to which reference is made herewith. The balancing weight for the balancing of the oscillating forces disclosed in mentioned patent specification is vertically guided by guide members. This design is satisfactory in case of machines having relatively small dimensions but may lead at machines having larger dimensions to difficulties arising at the structural members which take part at the vertical guiding, which difficulties stem from thermal expansions during the operation of the machine.

SUMMARY OF THE INVENTION

Hence, it is a general object of the present invention to provide an apparatus for balancing mass forces at a punch press, in which the guiding of the balancing weights for balancing the oscillating forces are supported such that thermal expansions do not detrimentally influence the vertical guiding.

A further object is to provide an apparatus for balancing mass forces at a punch press, in which the means for balancing the oscillating forces comprise balancing weights which are located relative to the vertical plane which includes the axis of rotation of the crank or eccentric, respectively, shaft symmetrically opposite of each other, of which each balancing weight is pivotably mounted at a first area to the frame, pivotably connected at a location distant from the first area via intermediate links forming the intermediate members to the means for balancing the rotating forces, and of which the oppositely located balancing weights are at second areas, which perform in operation a pivoting movement and are remote from the first areas, adapted to mutually guide each other in the direction of the vertical component of movement of the pivoting movement.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
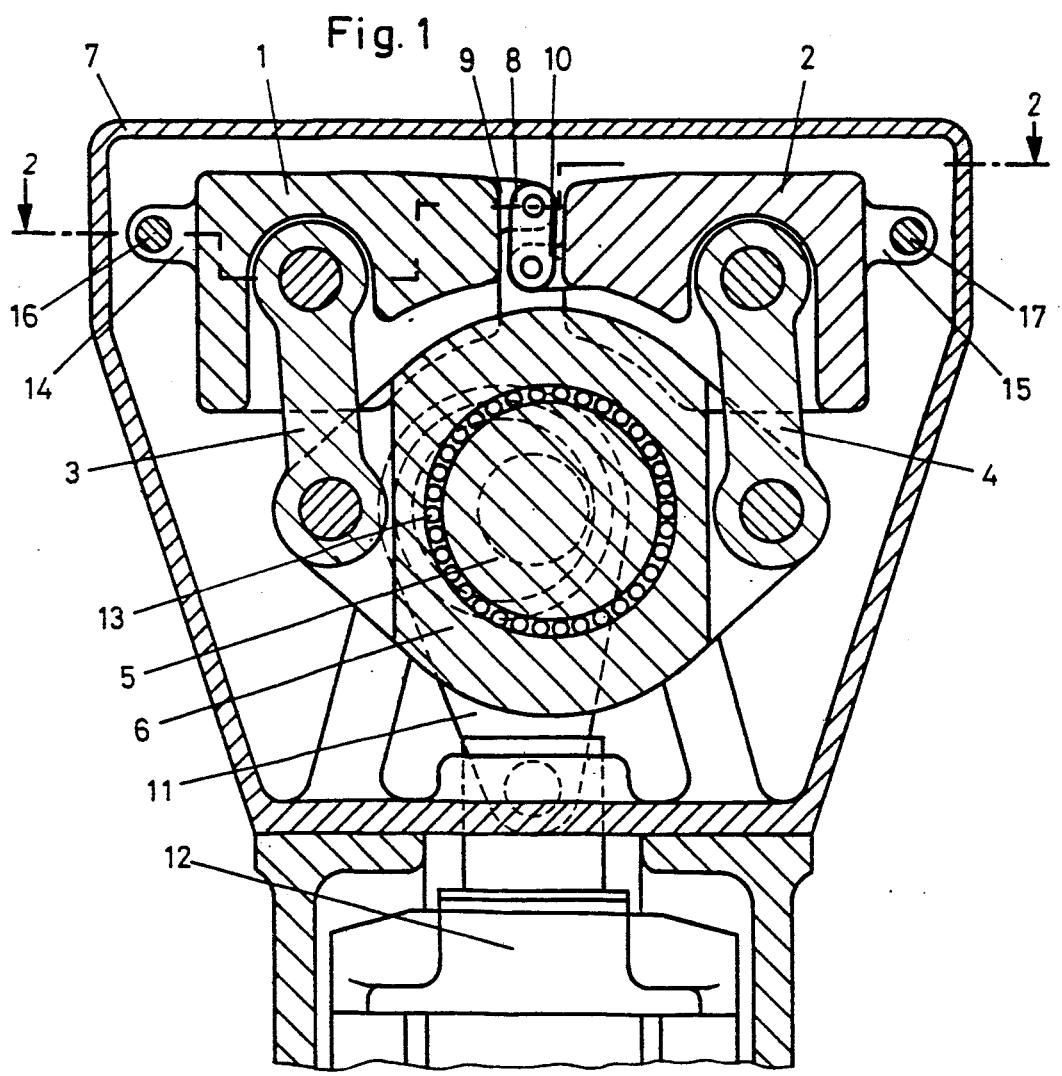
FIG. 1 is an asymmetrical vertical section through a preferred embodiment of the invention.

The crank- or eccentric shaft (crank and eccentric being used herein synonymously) 5 is supported in the frame 7 of the apparatus. Dependent on the prevailing design this crank or eccentric shaft 5 drives one or a plurality of punching rods 11, which are pivotally mounted in accordance with commonly known techniques to the punch 12 of the punch press. A yoke 6 is, furthermore, supported on the crank or eccentric shaft 5 via antifriction bearings 13. This yoke 6 serves for the balancing of the rotating mass forces in operation of the machine. Respective intermediate members 3, 4 are pivotally mounted to the respective lateral ends of the yoke 6 as link members. Thus, intermediate members 3, 4 are in turn pivotally mounted to balancing weights 1, 2, which serve for the balancing of the oscillating forces.

Accordingly, the yoke 6 which balances the rotating forces drives in operation of the machine via the link members 3, 4 the balancing weights 1, 2, for the balancing of the oscillating forces.

Figure 2:
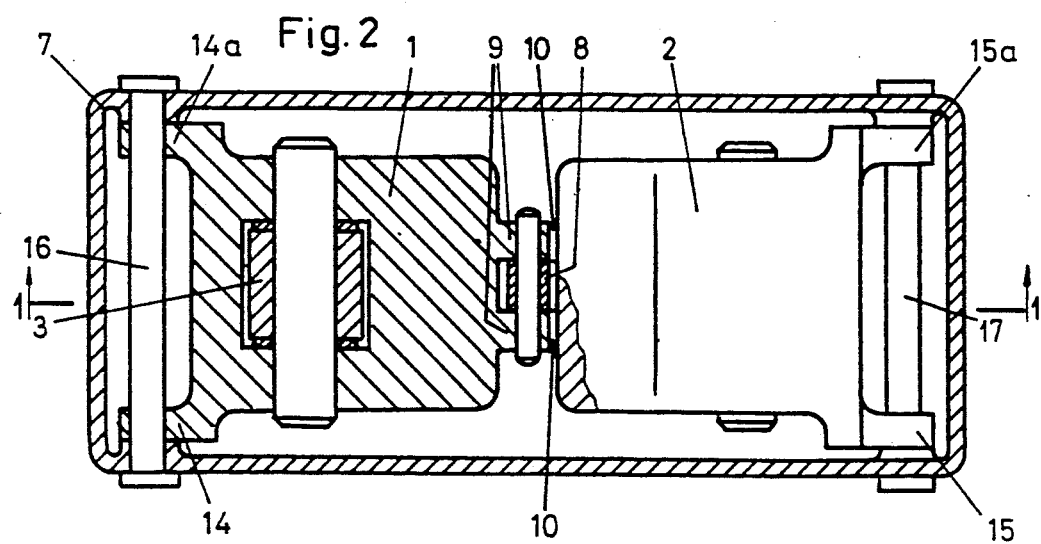
FIG. 2 is a section through the preferred embodiment along line II—II of FIG. 1 and showing the asymmetrical section of FIG. 1 along line I—I.

As can be seen from the drawings, the balancing weights 1, 2 are designed symmetrically relative to the vertical plane extending through the axis of rotation of the crank or eccentric shaft 5. The two ends of the balancing weights 1, 2, which face each other, include two respective bearing eyelets 9, 10 (see also FIG. 2). These bearing eyelets 9, 10 overlap each other and are pivotably connected to each other via a pivot member 8. According to the illustration of FIG. 1 this pivot member 8 extends vertically between the bearing eyelets 9, 10 and is mounted at its respective ends to the respective bearing eyelets 9, 10. At the ends opposite of the bearing eyelets 9, 10 the balancing weights 1, 2 include respective projections 14, 14a and 15, 15a. These projections are supported on shafts 16, 17, which in turn are supported in the machine frame 7.

Accordingly, in operation the two balancing weights 1, 2 are pivotably moved upwards and downwards via the link members 3, 4 around the shafts 16, 17, such that the balancing of the oscillating forces takes place. Quite obviously now a changing of the horizontal distance between the bearing eyelets 9, 10 of the balancing weights 1, 2 takes place in operation of the apparatus because these bearing eyelets 9, 10 move in operation along a section of a circular line. This small change of distance is now absorbed by the pivot member 8, which accordingly will move into a slanted position.

Due to the fact, that two balancing weights 1, 2 for the balancing of the oscillating forces are present, which are pivotably mounted at the one end to the machine frame 7 and at the other end via the pivot member 8 to each other, the vertical guiding which hitherto has been necessary is no longer needed.

It is distinctly to be noted that the mutual vertical guiding of the balancing weights 1, 2 by means of the illustrated pivot member 8 is only one of a plurality of embodiments. There are, for instance, embodiments foreseen, in which the balancing weights 1, 2 mesh at the ends facing each other via e.g. racks or they may be interconnected via steel webs for a guiding in the vertical direction.

While there is shown and described a present preferred embodiment of the invention, it is to be distinctly understood that the invention is not limited thereto, but may be otherwise variously embodied and practiced within the scope of the following claims.

I claim:

1. In a punch press having a frame, a crank shaft supported on said frame and defining an axis of rotation, and means for balancing rotating forces directly supported on said crankshaft, improved means for balancing oscillating forces, comprising:

two balancing weights respectively located on opposite sides of a vertical plane which includes the axis of rotation of said crank shaft and symmetrically opposite each other;

means for only pivotably mounting said balancing weights at respective first areas thereof to said frame;

intermediate link members respectively pivotably connected to said balancing weights at respective locations respectively spaced from said first areas of said balancing weights and to said means for balancing rotating forces for only pivoting movement of said balancing weights about said means for pivotably mounting said balancing weights; and pivoting means at respective second areas of said balancing weights that are respectively spaced form said first areas thereof and connecting said balancing weights for mutually guiding said balancing weights in said pivoting movement.

2. The apparatus of claim 1, in which said second areas of said balancing weights face each other, and said pivoting means include two bearing eyelets that respectively project from each said balancing weight to overlap each other and a pivot member pivotably connecting said bearing eyelets of each of said balancing weights to each other, said pivot member being vertically arranged between said two bearing eyelets of each said balancing weight and pivotably mounted thereto at two locations that are spaced from each other.

3. The apparatus of claim 2, in which said locations at which said intermediate link members are pivotably connected to said respective balancing weights are between said first and second areas of said balancing weights.

* * * * *